United States Patent

[11] 3,536,000

[72] Inventor Richard W. Whitehill
Cleveland Heights, Ohio (6007 Euclid Ave., Cleveland Ohio, 44113)
[21] Appl. No. 794,580
[22] Filed Jan. 28, 1969
[45] Patented Oct. 27, 1970

[54] DEVICE FOR MAKING DISPOSABLE BROILING PANS
5 Claims, 3 Drawing Figs.

[52] U.S. Cl. .................................................. 99/425, 79/385
[51] Int. Cl. ................................................... A47j 37/10
[50] Field of Search ........................................ 99/425—26, 88, 181, 332, 349, 400, 422—23—24, 428, 430, 432—33, 439, 444; 107/1(.1), 1(.5), 15(.9), 19, 47, 54(.28), 66; 18/16(E), 16(P), 16(M), 19(BM), 19(A), 22, 35, 1; 72/48, 272, 379, 385; 93/51, 36.3; 113/120; 211/106, 181; 220/19, 24.5

[56] References Cited
UNITED STATES PATENTS

| | | | |
|---|---|---|---|
| 1,945,397 | 1/1934 | Gray | 99/428UX |
| 2,669,914 | 2/1954 | Swaine | 93/51 |
| 2,703,078 | 3/1955 | Hammond | 99/422UX |
| 2,772,627 | 12/1956 | Newell | 99/425 |
| 2,849,949 | 9/1958 | Trachtman | 99/425 |
| 3,295,168 | 1/1967 | Gale et al. | 107/15.9X |
| 3,427,955 | 2/1969 | Menzin | 99/425 |

*Primary Examiner*—William I. Price
*Assistant Examiner*—Arthur O. Henderson
*Attorney*—Milburn and Milburn ABSTRACT: A device for use by the housewife and consisting of upper and lower mating rectangular tray-like members of substantially rigid wire construction, the bottom parallel spaced wires of the upper member being adapted to press a sheet of aluminum foil or other pliable material down between the bottom parallel spaced wires of the lower member when in mating engagement and thereby form the sheet with parallel grooves adapted to receive and hold the grease from the broiling operation and thus serve as a disposable broiling pan at little cost.

Patented Oct. 27, 1970   3,536,000

INVENTOR,
Richard W. Whitehill
by Milburn & Milburn
ATTORNEYS

DEVICE FOR MAKING DISPOSABLE BROILING PANS

Disposable or "throw-away" broiling pans per se are not new, as shown by the following U.S. Pat. Nos. 2,772,627; 2,849,949; 3,113,505; 3,211,082 and 3,236,403. However, this invention is directed to a particular device adapted for ready use by the housewife for forming such a broiling pan whenever desired and in a comparatively economical manner.

The disposable broiling pan that is made by the present device possesses not only the familiar advantage of being able to throw it away after it has been used and thereby avoid the trouble of cleaning the regular broiling pan of the conventional stove; but this invention is distinguished by the fact that it enables the housewife to make her own disposable broiling pans whenever desired and at reduced cost as compared with those now on sale.

Accordingly, the object of this invention is to provide a comparatively inexpensive form of device that can be used in the home in a convenient and efficient manner to make a disposable or "throw-away" broiling pan of aluminum foil or other suitable pliable material at comparatively little cost.

A more specific object is to provide such a device with means to serve as a guide for placing the sheet of pliable material in proper position upon the lower member preparatory to interengagement between the two members.

Another specific object is to provide such a device with a registering means between the upper and lower members so as to ensure proper staggered relationship of the bottom wires of the two members as they are brought into operative mating engagement with each other.

Another object is to provide such a device with means for determining the proper extent of downward engagement of the upper member with the lower member so as to ensure proper relative positioning of the bottom wires of the two members for forming the grooves in the pliable material.

A further object is to provide the lower member of this device with legs of such form that they will permit the lower member with the broiling pan thereupon to be slid into the oven in any direction.

Other objects will appear from the following description and claims when considered together with the accompanying drawing.

Figure 1:
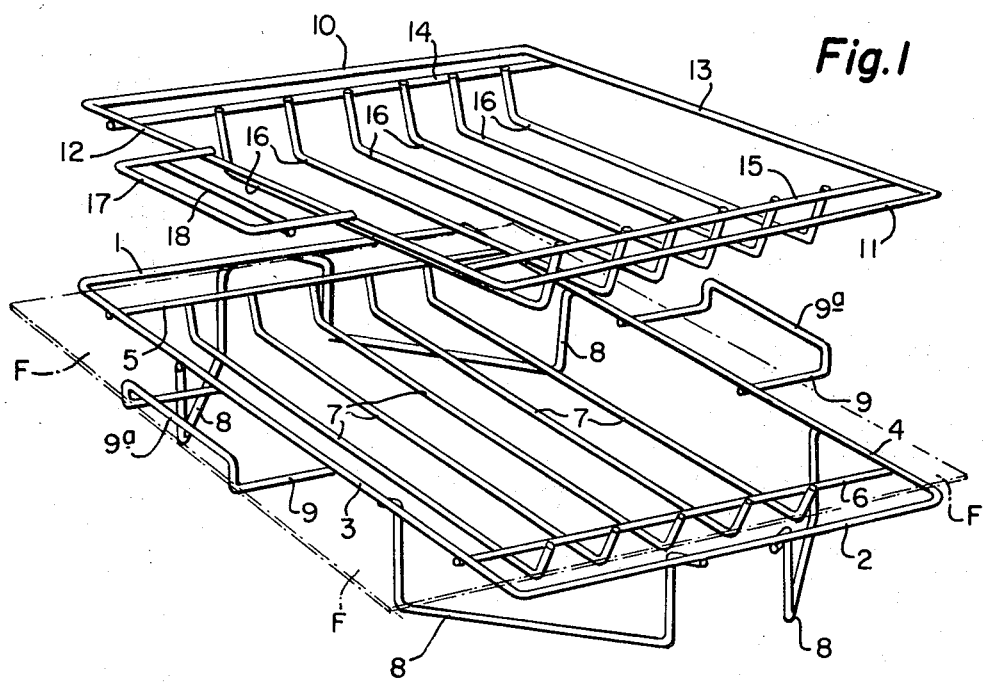
FIG. 1 is a distended perspective view of my device.
Figure 2:
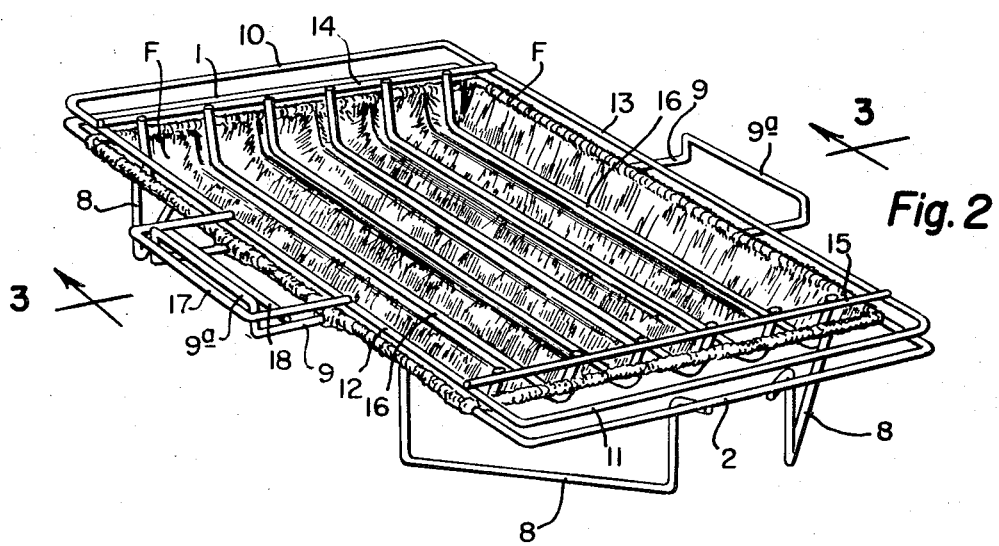
FIG. 2 is a perspective view of this device with the parts thereof in operative position.

Both the upper and lower members consist of substantially rigid wire throughout; and, since the upper member is adapted to press the sheet of pliable material down into the lower member, the upper member may be referred to as the former.

Referring now to the accompanying drawing in detail, the lower member has a marginal closed rectangular wire with end portions 1 and 2 and side portions 3 and 4. Extending between the side portions 3 and 4 and spaced from the end portions 1 and 2 are the wires 5 and 6 to which are attached the ends of the spaced multiple wires 7 extending parallel to the side portions 3 and 4 and with downwardly and inwardly inclined ends so as to form a tray-like bottom for the lower member. The legs 8 of substantially U-shape depend from the under side of the lower member and extend across the four corners of the lower member, being attached at their ends to the side and end portions of the lower member so as to extend at an angle of approximately 45°, the two legs at each end of the lower member diverging from each other. With this arrangement, the lower member can be slid into and out of the oven in any direction upon its legs.

Extending laterally from the middle of each side portion 3 and 4 is a substantially U-shaped wire 9 with its outer or bight portion 9a turned upwardly. These wires 9 will serve as handles, as will also the end portions 1 and 2; and the portions 9a will serve also as a gauge means in aligning the sheet of foil F as it is initially placed upon the lower member, while the cross wires 2 and 3 may serve as a means of determining the proper length of foil to be cut from the supply roll of foil. Then, when the foil F has been properly aligned between the upturned portions 9a and the proper length of the foil has been cut, it is ready for downward engagement by the upper member which will now be described.

The upper member, similar to the lower member, has a marginal closed rectangular wire with end portions 10 and 11 and side portions 12 and 13, with transverse wires 14 and 15 extending between and attached to the side portions 12 and 13 near but spaced from the end portions 10 and 11, so as to provide end handles. The multiple wires 16 extend parallel to the side portions 12 and 13 and have their end portions inclined downwardly and inwardly from the wires 14 and 15 to which they are attached at their ends. A substantially U-shaped wire 17 extends outwardly from one of the side portions 12 and has a wire 18 extending thereacross near but spaced from the bight of the wire 17 so as to provide an eye for engagement over either of the upstanding portions 9a of the U-shaped wires 9 of the lower member. This will ensure proper position of the upper member upon the lower member for staggered relation between the wires 16 of the upper former member and the wires 7 of the lower member when they are brought into operative mating engagement with each other. The forming wires 16 of the upper member will extend farther downwardly than the bottom wires 7 of the lower member, as indicated in FIG. 3 of the drawing, so that the wires 16 will depress the foil F down between the wires 7 of the lower member and thereby form the alternating parallel grooves and ridges in the foil which then becomes the disposable broiling pan.

Figure 3:
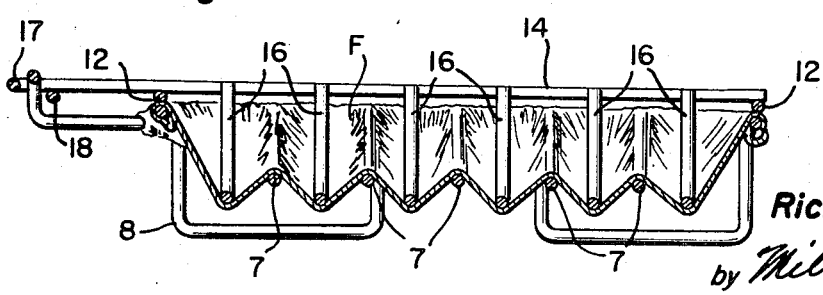
FIG. 3 is a sectional view taken on line 3–3 of FIG. 2.

This device is so constructed and arranged that the sheet of foil F, having been placed and cut the proper length upon the lower member, as indicated in FIG. 1 of the drawing, may then be depressed by mating engagement of the upper member with the lower member so as to cause the foil to assume the form indicated in FIG. 3 of the drawing. As above explained, in placing the upper member down upon the lower member, the eye provided by the wire 18 will be engaged over the upstanding portion 9a so as to ensure proper staggered relation between the bottom wires of the two members; and, at the same time, the parts are so constructed and arranged that engagement of the handles of the upper member upon the lower member will determine the proper extent of downward engagement of the upper member with the lower member in order to effect the result indicated in FIG. 3 of the drawing. Then, while the upper and lower members are still in mating engagement with each other, the edges of the foil F will be crimped about the side wires 3 and 4 and the wires 5 and 6 of the lower member so that the foil F will not be disturbed when the upper former member is removed and also to ensure proper position of the foil as a broiling pan upon the lower member during the broiling operation. Then, upon removal of the upper member, the broiling pan is ready for use while still upon the lower member.

As will be understood, the grease incident to the broiling operation will collect in the grooves of the foil F; and, upon completion of the broiling, the foil can be removed from the lower member and discarded, leaving the lower member as well as the upper member in clean condition for repeated use whenever desired by the housewife and in the same manner as above described. As will of course be understood, the regular broiling pan of the conventional stove will also remain free of the grease to which it would be subjected except for the disposable broiling pan. In addition to this familiar advantage of the disposable broiling pan, the present invention makes it possible for the housewife to make such a "throw-away" broiling pan at home whenever desired and in a convenient and efficient manner at relatively low cost.

Other advantages will readily suggest themselves from the above disclosure which might be modified without departing from the spirit of the present invention, as set forth in the following claims.

I claim:

1. A device for forming a disposable broiling pan, comprising upper and lower mating rectangular tray-like members with inclined sides of substantial depth, the bottom of each of said members having substantially spaced parallel unidirectional substantially rigid wires, the wires of the one member being so spaced with respect to those of the other member that they will assume staggered relation when said members are in mating engagement with each other, said upper member being of greater depth than said lower member so as to force a sheet of pliable material down between the wires of the lower member and thereby form the pliable material with parallel alternating ridges and grooves, laterally extending handles on two opposite sides of each of said members, the handles of the upper member adapted to have overlying engagement with the lower member so as to determine the extent of downward engagement of the upper member for proper formation of the ridges and grooves in the pliable material.

2. The same structure as recited in claim 1 hereof and with the addition of angularly extending legs upon the bottom of said lower member so as to permit sliding movement of the same in any direction.

3. The same structure as recited in claim 1 hereof and with the addition of means for ensuring proper positioning of the upper member for operative staggered relation of the wires of said members upon initiation of the mating engagement of the upper member with the lower member.

4. The same structure as recited in claim 1 hereof and with the addition of a laterally and upwardly extending projection upon one of the other two sides of the lower member, and one of the other two sides of the upper member having an eye-like projection adapted for registry with said upwardly extending projection of the lower member so as to ensure proper positioning of the upper member for operative staggered relation of the wires of the two members upon initiation of the mating engagement of the upper member with the lower member, said handles and projections of the lower member being of suitable lateral extent to serve as a gauge for the proper size and alignment of the sheet of pliable material in placing the same upon the lower member preparatory to operative engagement by the upper member.

5. A device for forming a disposable broiling pan, comprising upper and lower mating rectangular tray-like members with inclined sides of substantial depth, the bottom of each of said members having substantially spaced parallel unidirectional substantially rigid groove-forming elements, the elements of the one member being so spaced with respect to those of the other member that they will assume staggered relation when said members are in mating engagement with each other, said upper member being of greater depth than said lower member so that the elements of the upper member will force a sheet of pliable material down between the elements of the lower member and thereby form the pliable material with parallel alternating ridges and grooves, said upper member being provided with means for determining the extent of downward engagement of the upper member within the lower member so as to ensure formation of the ridges and grooves in the pliable material, and said members being provided with interengageable means for ensuring proper lateral positioning of the upper member upon the lower member for staggered relation of the elements of the two members upon initiation of the mating engagement therebetween.